United States Patent
Noguchi et al.

(10) Patent No.: US 11,913,524 B2
(45) Date of Patent: Feb. 27, 2024

(54) TOROIDAL CONTINUOUSLY VARIABLE TRANSMISSION AND DRIVE MECHANISM-INTEGRATED ELECTRICITY GENERATION APPARATUS FOR AIRCRAFT

(71) Applicant: KAWASAKI JUKOGYO KABUSHIKI KAISHA, Kobe (JP)

(72) Inventors: Yoshiyuki Noguchi, Kobe (JP); Yuji Shinoda, Kobe (JP); Hideyuki Imai, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 243 days.

(21) Appl. No.: 17/628,752

(22) PCT Filed: Jun. 25, 2020

(86) PCT No.: PCT/JP2020/025017
§ 371 (c)(1),
(2) Date: Jan. 20, 2022

(87) PCT Pub. No.: WO2021/014880
PCT Pub. Date: Jan. 28, 2021

(65) Prior Publication Data
US 2022/0356930 A1 Nov. 10, 2022

(30) Foreign Application Priority Data
Jul. 22, 2019 (JP) .................................. 2019-134699

(51) Int. Cl.
*F16H 15/38* (2006.01)
*B64D 41/00* (2006.01)
(Continued)

(52) U.S. Cl.
CPC ............. *F16H 15/38* (2013.01); *B64D 41/00* (2013.01); *F16H 57/042* (2013.01); *F16H 57/049* (2013.01); *H02K 7/116* (2013.01)

(58) Field of Classification Search
CPC .... F16H 15/38; F16H 57/042; F16H 57/0456; B64D 41/00; H02K 7/116
See application file for complete search history.

(56) References Cited

U.S. PATENT DOCUMENTS 2,019,815 A * 11/1935 Holtham ............... F23D 11/383
239/493
6,616,568 B2 * 9/2003 Ooyama .................. F16H 15/38
476/40
(Continued)

FOREIGN PATENT DOCUMENTS

JP 2013-002607 A 1/2013
JP 2016-166642 A 9/2016

OTHER PUBLICATIONS

Extended European Search Report dated Jul. 3, 2023, in Application No. 20845042.9.

*Primary Examiner* — William C Joyce
(74) *Attorney, Agent, or Firm* — Sughrue Mion, PLLC

(57) ABSTRACT

Provided is a toroidal continuously variable transmission that can create a jet of oil resistant to the influence of wind generated by rotation of a power roller, thereby feeding a sufficient amount of oil to the power roller to cool the power roller with the oil; and a drive mechanism-integrated electricity generation apparatus for an aircraft, the electricity generation apparatus including the toroidal continuously variable transmission. The toroidal continuously variable transmission includes a discharge structure including an outlet that discharges an oil. The discharge structure includes first and second oil passages connected with each other inside the discharge structure, and arranged such that (Continued)

the oil flowing through the first oil passage and the second oil passage collide with each other in the vicinity of the outlet and that a jet of oil discharged from the outlet forms a flattened shape extending along a rotational direction of the power roller.

7 Claims, 12 Drawing Sheets

(51) Int. Cl.
*H02K 7/116* (2006.01)
*F16H 57/04* (2010.01)

(56) References Cited

U.S. PATENT DOCUMENTS

| | | | |
|---|---|---|---|
| 7,476,175 B2 * | 1/2009 | Elser | F16H 15/38 |
| | | | 476/40 |
| 11,362,566 B2 * | 6/2022 | Tanaka | H02K 7/1815 |
| 11,428,309 B2 * | 8/2022 | Imai | F16H 15/38 |
| 2018/0062480 A1 | 3/2018 | Tanaka et al. | |

* cited by examiner

TOROIDAL CONTINUOUSLY VARIABLE TRANSMISSION AND DRIVE MECHANISM-INTEGRATED ELECTRICITY GENERATION APPARATUS FOR AIRCRAFT

CROSS REFERENCE TO RELATED APPLICATIONS

This application is a National Stage of International Application No. PCT/JP2020/025017 filed Jun. 25, 2020, which designates the United States, incorporated herein by reference, which claims the benefit of priority based on Japanese Patent Application No. 2019-134699 filed Jul. 22, 2019, the entire contents of which are incorporated herein by reference.

TECHNICAL FIELD

The present invention relates to a toroidal continuously variable transmission and a drive mechanism-integrated electricity generation apparatus for an aircraft.

BACKGROUND ART

A toroidal continuously variable transmission is conventionally known in which a power roller is held between input and output discs and in which the tilt angle of the power roller is changed to vary the rotational speed ratio between the input and output discs (speed ratio). In the toroidal continuously variable transmission, the input and output discs rotate while being pressed against the power roller. Thus, an oil is fed to the regions where the power roller is in contact with the input and output discs (see Patent Literature 1, for example).

CITATION LIST

Patent Literature

PTL 1: Japanese Laid-Open Patent Application Publication No. 2013-2607

SUMMARY OF INVENTION

Technical Problem

The toroidal continuously variable transmission disclosed in Patent Literature 1 includes a discharge structure including outlets, from which an oil is fed toward the regions where the discs and the power roller are in contact. In Patent Literature 1, a jet of oil is discharged from each outlet which is circular and located at a downstream end of a single flow path. Thus, the jet of oil spreads into a conical shape while moving ahead. In the case where the jet of oil is in such a shape, the oil is likely to be blown off due to a cause such as a wind generated by rotation of the power roller. This could lead to shortage of the amount of the oil fed to the power roller, thus resulting in a failure to cool the power roller sufficiently.

A possible approach to compensating for insufficient cooling of the power roller may be to increase the feed amount of the oil. In this case, it is conceivable to increase the output of an oil pump in order to increase the feed amount of the oil. However, increasing the output of the oil pump could involve an increase in the capacity of the oil pump, resulting in a size increase of the apparatus configuration and a weight increase of the apparatus. Additionally, in the case where the output of the oil pump is increased, the temperature of the oil could be raised as a result of the oil being churned by the high-output oil pump, and accordingly the efficiency of cooling with the oil could be reduced.

In view of the above circumstances, the present invention aims to provide: a toroidal continuously variable transmission that can create a jet of oil resistant to the influence of a wind generated by rotation of a power roller, thereby feeding a sufficient amount of oil to the power roller and achieving sufficient cooling of the power roller with the oil; and a drive mechanism-integrated electricity generation apparatus for an aircraft, the electricity generation apparatus including the toroidal continuously variable transmission.

Solution to Problem

A toroidal continuously variable transmission according to the present invention includes: input and output discs opposed to each other; a power roller tiltably held between the input and output discs to transmit rotational drive power of the input disc to the output disc at a speed ratio determined by a tilt angle of the power roller; and a discharge structure including an outlet that discharges an oil, wherein the discharge structure includes first and second oil passages connected with each other inside the discharge structure, and the first and second oil passages are arranged such that the oil flowing through the first oil passage and the oil flowing through the second oil passage collide with each other in the vicinity of the outlet and that a jet of oil discharged from the outlet forms a flattened shape extending along a rotational direction of the power roller.

In the toroidal continuously variable transmission configured as above, the first and second oil passages are arranged such that the jet of oil forms a flattened shape extending along the rotational direction of the power roller. As such, the jet of oil has a small area when viewed in the rotational direction of the power roller, and the jet of oil is extended in the rotational direction. Thus, the jet of oil can be shaped to resist being blown off by a wind generated by rotation of the power roller. This allows for reliable cooling of the power roller.

Centerlines of the first and second oil passages may intersect at a point located in the same plane as an end surface of the discharge structure, the end surface being a surface at which the outlet is located.

Since the centerlines of the first and second oil passages intersect at a point located in the same plane as the outlet, the wall surfaces defining the first and second oil passages guide the oil flowing through the first oil passage and the oil flowing through the second oil passage, respectively, to ensure that the oil flows collide with each other inside the discharge structure. As such, the oil flowing through the first oil passage and the oil flowing through the second oil passage can invariably collide with each other, and the jet of oil can form a flattened shape.

Centerlines of the first and second oil passages may intersect at an external point downstream of an end surface of the discharge structure in a direction in which the oil is discharged from the outlet, the end surface being a surface at which the outlet is located.

Even in the case where the centerlines of the first and second oil passages intersect at the external point downstream of the end surface at which the outlet is located, the wall surfaces defining the first and second oil passages guide the oil flowing through the first oil passage and the oil flowing through the second oil passage, respectively, to ensure that the oil flows collide with each other. Thus, the oil flowing through the first oil passage and the oil flowing through the second oil passage can invariably collide with each other, and the jet of oil can form a flattened shape.

Centerlines of the first and second oil passages may intersect at an internal point upstream of an end surface of the discharge structure in a direction in which the oil is discharged from the outlet, the end surface being a surface at which the outlet is located.

Even in the case where the centerlines of the first and second oil passages intersect at the internal point upstream of the end surface at which the outlet is located, the wall surfaces defining the first and second oil passages guide the oil flowing through the first oil passage and the oil flowing through the second oil passage, respectively, to ensure that the oil flows collide with each other. Thus, the oil flowing through the first oil passage and the oil flowing through the second oil passage can invariably collide with each other, and the jet of oil can form a flattened shape.

An angle between the first and second oil passages may be 80° or less.

Since the angle between the first and second oil passages is 80° or less, the flattened jet of oil is prevented from being excessively thin and thus resists being blown off by a wind. As such, the power roller can be cooled sufficiently.

A toroidal continuously variable transmission according to the present invention includes: input and output discs opposed to each other; a power roller tiltably held between the input and output discs to transmit rotational drive power of the input disc to the output disc at a speed ratio determined by a tilt angle of the power roller; and a discharge structure including an outlet that discharges an oil, wherein the discharge structure includes first and second oil passages connected with each other inside the discharge structure, the first and second oil passages are located inside the discharge structure such that a connection region where the first and second oil passages are connected intersects with an end surface of the discharge structure, the end surface being a surface at which the outlet is located, and the discharge structure is disposed such that a jet of oil discharged from the outlet is extended along a rotational direction of the power roller.

In the toroidal continuously variable transmission configured as above, the first and second oil passages are located inside the discharge structure such that the connection region where the first and second oil passages are connected intersects with the end surface at which the outlet is located. This means that the first and second oil passages are connected with each other in the vicinity of the end surface. Thus, the wall surfaces defining the first and second oil passages guide the oil flowing through the first oil passage and the oil flowing through the second oil passage, respectively, to ensure that the oil flows collide with each other in the vicinity of the outlet. Thus, the oil flowing through the first oil passage and the oil flowing through the second oil passage can invariably collide with each other, and the jet of oil can form a flattened shape. Additionally, since the discharge structure is disposed such that the jet of oil is extended along the rotational direction of the power roller, the portion of the jet of oil that faces in the rotational direction of the power roller has a small area. Thus, the jet of oil can be shaped to resist being blown off by a wind generated by rotation of the power roller. This allows for reliable cooling of the power roller.

A drive mechanism-integrated electricity generation apparatus for an aircraft according to the present invention may include: the toroidal continuously variable transmission as defined above; an input mechanism that inputs rotational drive power from a rotational shaft of an engine of the aircraft to the toroidal continuously variable transmission; and an electricity generator driven by output of the toroidal continuously variable transmission.

The drive mechanism-integrated electricity generation apparatus configured as above is constructed using the toroidal continuously variable transmission capable of reliable cooling of the power roller. Thus, in the drive mechanism-integrated electricity generation apparatus, the temperature increase of the power roller can be minimized.

Advantageous Effects of Invention

According to the present invention, the power roller can be cooled reliably. Thus, the temperature increase of the power roller held between the input and output discs can be minimized to prevent the power roller from being excessively hot. As such, a toroidal continuously variable transmission and a drive mechanism-integrated electricity generation apparatus having high reliability can be provided.

DESCRIPTION OF EMBODIMENTS

Hereinafter, exemplary embodiments will be described with reference to the drawings.

[Aircraft Electricity Generation Apparatus]

Figure 1:
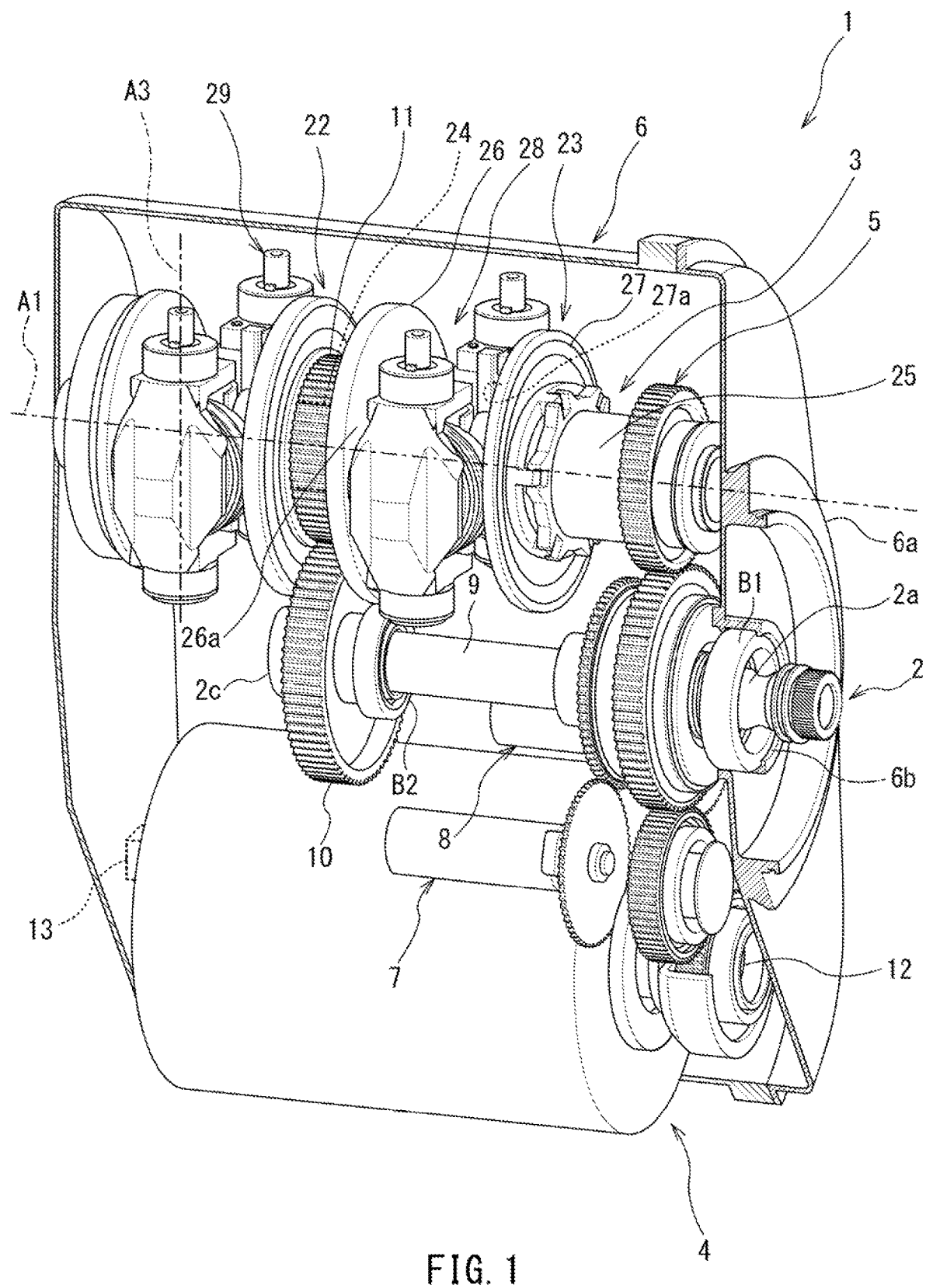
FIG. 1 is a cross-sectional perspective view showing the configuration of an aircraft electricity generation apparatus including a transmission according to an exemplary embodiment.

FIG. 1 is a cross-sectional perspective view showing the configuration of an aircraft electricity generation apparatus (drive mechanism-integrated electricity generation apparatus for an aircraft) 1 according to an exemplary embodiment. This electricity generation apparatus may be hereinafter referred to as "electricity generation apparatus 1". The electricity generation apparatus 1 is a drive mechanism-integrated electricity generation apparatus. The electricity generation apparatus 1 includes: an input mechanism 2 that inputs rotational drive power from a rotational shaft of an engine of an aircraft to a transmission (toroidal continuously variable transmission) 3; the transmission 3 disposed in parallel to the input mechanism 2; an electricity generator 4 disposed in parallel to the input mechanism 2 and transmission 3 and driven by output of the transmission 3; a power transfer mechanism 5 located toward a first axial end 2a of the input mechanism 2 to transmit the output of the transmission 3 to the electricity generator 4; a casing 6 including a mounting portion 6a located toward the first axial end 2a of the input mechanism 2; and accessory devices including oil pumps 7 and 8 driven by the output of the transmission 3.

The input mechanism 2 transmits the rotational drive power of the engine to the transmission 3. The input mechanism 2 includes a shaft main body 9 and a transfer gear 10 located toward a second axial end 2c that is in proximity to the transmission input gear 11, the transfer gear 10 being close to one end of the shaft main body 9. The transfer gear 10 is in mesh with the transmission input gear 11. The input mechanism 2 is rotatably supported by a bearing B1 located around the circumference of an opening 6b of the casing 6 and a bearing B2 located inside the casing 6.

The electricity generator 4 includes an electricity generator input shaft 12 located toward the first axial end 2a of the input mechanism 2 which is in proximity to the opening 6b of the casing 6. The electricity generator input shaft 12 serves to input drive power to the electricity generator 4. Once the output of the transmission 3 is input to the electricity generator input shaft 12 through the power transfer mechanism 5, the electricity generator 4 generates electricity therein, and the generated electricity is drawn through a terminal 13 projecting out of the casing 6. In the electricity generation apparatus 1, the speed ratio of the transmission 3 is adjusted so that the output of the transmission 3 is input to the electricity generator input shaft 12 through the power transfer mechanism 5 in the form of rotational drive power that produces rotation at a given speed. Thus, AC power with a given frequency is generated by the electricity generator 4 and supplied to an external device through the terminal 13.

The power transfer mechanism 5 transmits the output of the transmission 3 to the electricity generator 4 and other devices such as the oil pumps 7 and 8. The oil pump 7 is an oil feed pump that feeds a lubricating oil to components such as the transmission 3 and power transfer mechanism 5. The oil pump 8 is an oil suction pump that sucks in the oil retained in the casing 6.

The casing 6 is shaped as a thin, elongated, flattened box. The mounting portion 6a is an annular flange located at one side surface of the casing 6. The electricity generation apparatus 1 is mounted to the engine by winding a mounting tool such as a clamping band around the mounting portion 6a. In the region surrounded by the mounting portion 6a there is the opening 6b communicating with the interior of the casing 6. The first axial end 2a of the input mechanism 2 projects out of the opening 6b.

[Transmission]

The transmission 3 is a continuously variable transmission of the traction drive type and may be, for example, a half-toroidal continuously variable transmission of the double cavity type. The transmission 3 includes: an input structure 22 located toward the second axial end 2c of the input mechanism 2 to receive output from the input mechanism 2; and an output structure 23 located toward the first axial end 2a of the input mechanism 2 to transmit output resulting from a speed change process to the power transfer mechanism 5. Specifically, the transmission 3 includes: a hollow transmission input shaft 24 rotatably supported by a non-illustrated bearing inside the casing 6; and a transmission output shaft 25 inserted into the hollow interior of the transmission input shaft 24 and having an axially central portion enclosed by the transmission input shaft 24, the transmission output shaft 25 being rotatable independently of the transmission input shaft 24. In the present embodiment, the rotational centers of the transmission input and output shafts 24 and 25 coincide with the axial centerline of the transmission. In the present embodiment, the axial centerline of the transmission will hereinafter be referred to as "transmission axis A1".

The transmission 3 includes: the transmission input gear 11 which functions as an element of the input structure 22; a pair of input discs 26 mounted respectively on opposite surfaces of the transmission input gear 11; and a pair of output discs 27 mounted on the transmission output shaft 25, each output disc 27 being opposed to a corresponding one of the input discs 26. The transmission input gear 11 and the pair of input discs 26 are rotatable about the transmission axis A1 together with the transmission input shaft 24. The pair of output discs 27 are rotatable about the transmission axis A1 together with the transmission output shaft 25. An annular cavity 28 is located between the input and output discs 26 and 27 opposed to each other. The two cavities 28 extend around the transmission axis A1 and are aligned in the direction of the transmission axis A1. In the transmission 3, one of the output discs 27 that is closer to the mounting portion 6a than the other output disc 27 functions as an element of the output structure 23.

Figure 2:
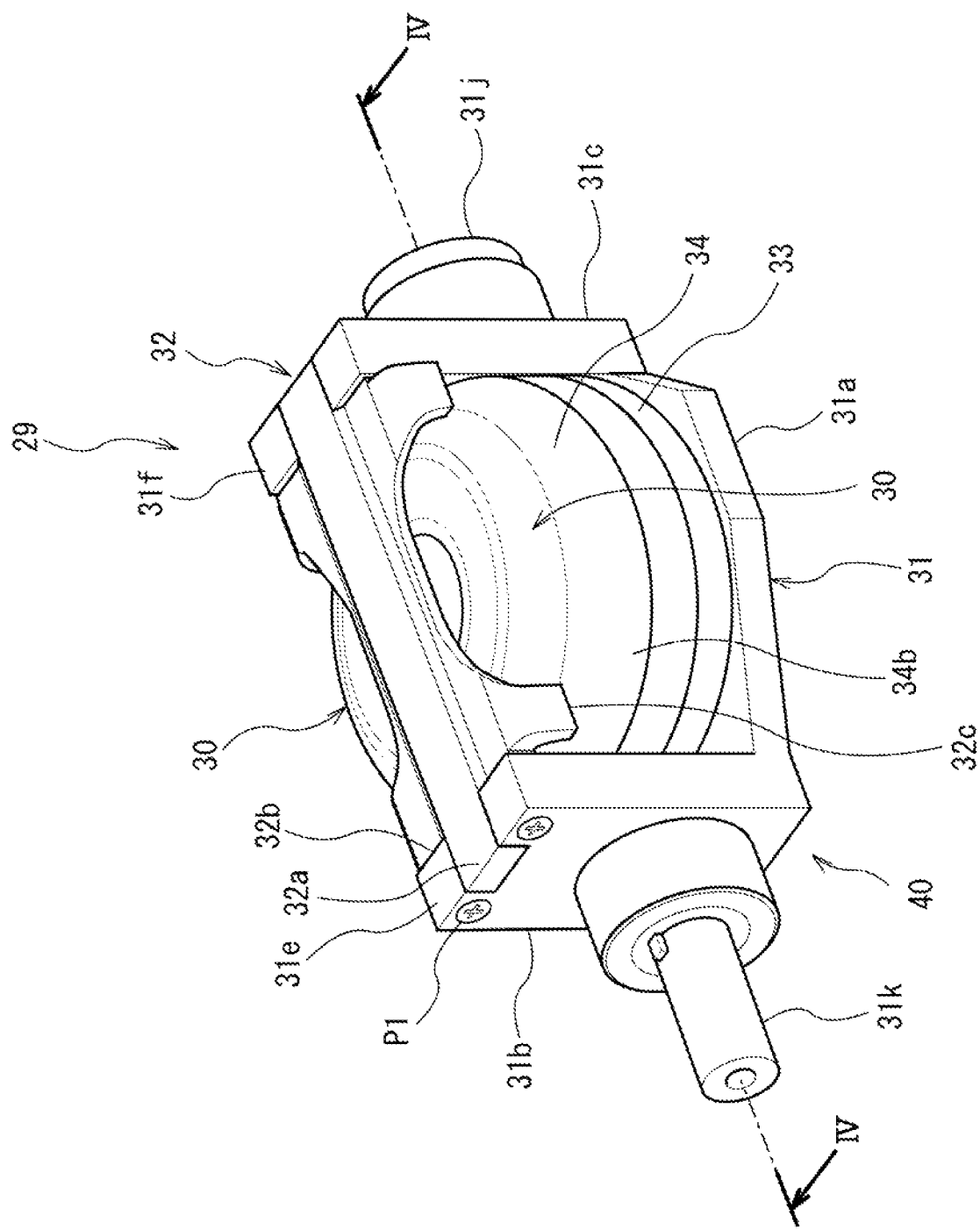
FIG. 2 is a perspective view of a speed change unit of the transmission included in the aircraft electricity generation apparatus of FIG. 1.
Figure 3:
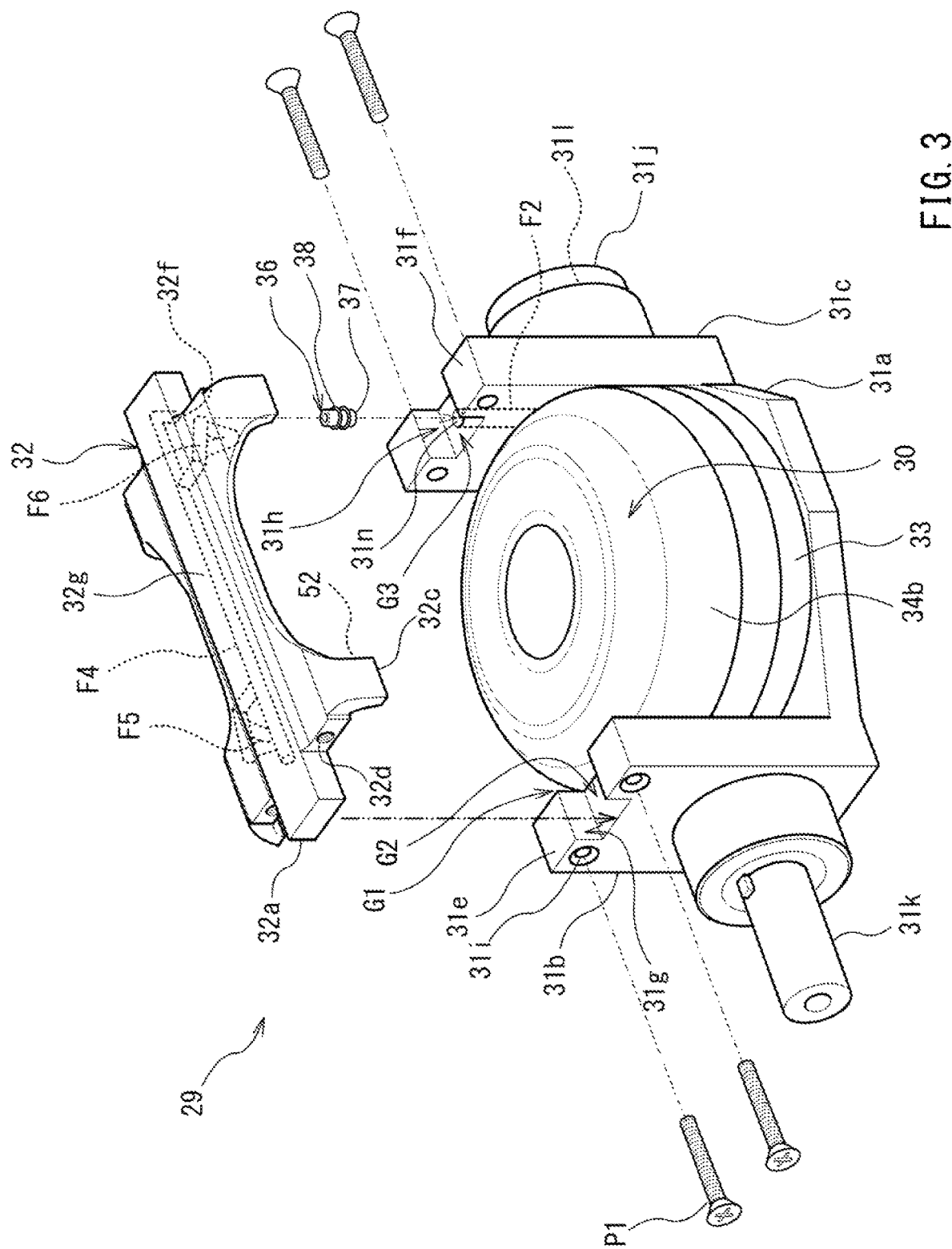
FIG. 3 is a partially exploded perspective view of the speed change unit of FIG. 2.
Figure 4:
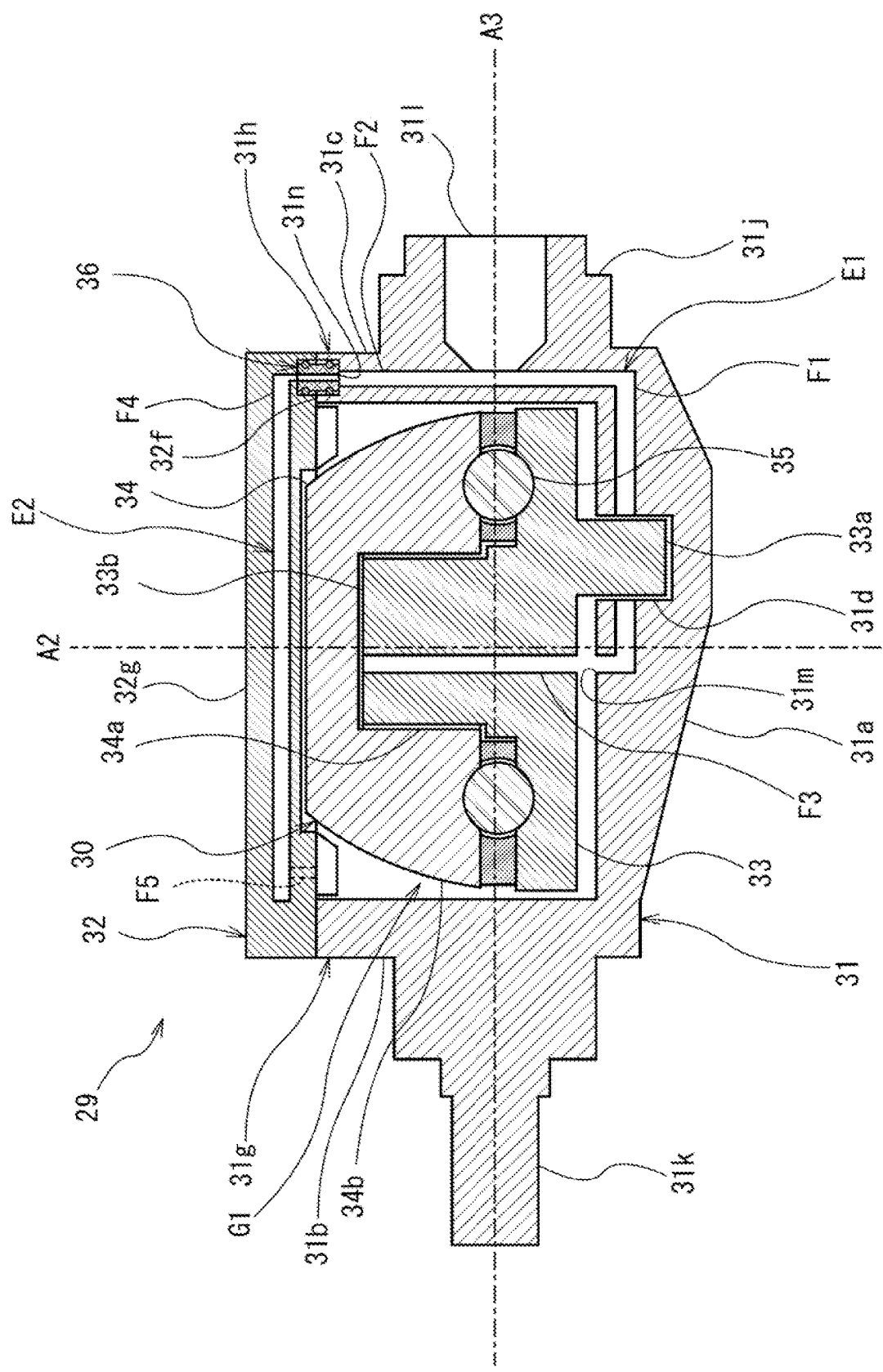
FIG. 4 is a cross-sectional view taken along the line IV-IV of FIG. 2.

The transmission 3 includes speed change units 29 disposed in the cavities 28. FIG. 2 is a perspective view showing the configuration of the speed change unit 29. FIG. 3 is a partially exploded perspective view of the speed change unit 29. FIG. 4 is a cross-sectional view of the speed change unit 29 taken along the line IV-IV of FIG. 2. As shown in FIGS. 2 and 3, the speed change unit 29 is an assembly constructed of a power roller unit 30, a trunnion 31, and a beam (discharge structure) 32. In the transmission 3, as shown in FIG. 1, two of the speed change units 29 are arranged in parallel in each of the pair of cavities 28 aligned in the direction of the transmission axis A1.

The power roller unit 30 is supported by the trunnion 31. As shown in FIG. 4, the power roller unit 30 includes: a support 33 mounted on the trunnion 31; a substantially hemispherical power roller 34 rotatably supported by the support 33; and a bearing 35 located between the support 33 and power roller 34 to rotatably support the power roller 34.

The support 33 is a substantially disc-shaped plate and includes an eccentric shaft 33a projecting toward the trunnion 31. The support 33 is supported at the eccentric shaft 33a by the trunnion 31. The support 33 further includes a roller rotational shaft 33b projecting along a rotational axis A2 in a direction opposite to that in which the eccentric shaft 33a projects.

The power roller 34 includes a recessed, rotatably supported portion 34a that faces the roller rotational shaft 33b. The roller rotational shaft 33b is inserted into the rotatably supported portion 34a to rotatably support the power roller 34 so that the power roller 34 is rotatable about the axis of the roller rotational shaft 33b. Thus, the power roller 34 is rotatably supported about the rotational axis A2. The circumferential surface 34b of the power roller 34 is a gently curved surface. During operation, the lubricating oil forms an oil film on the circumferential surface 34b of the power roller 34. The transmission 3 includes a non-illustrated pressing mechanism located in the vicinity of either of the output discs 27 to hold the circumferential surface 34b of each power roller 34 between the input and output discs 26 and 27 with a given pressing force. While being pressed by the pressing mechanism, the power roller 34 is tiltably held between a roller-facing surface 26a of the input disc 26 and a roller-facing surface 27a of the output disc 27, with the oil film interposed between the power roller 34 and the roller-facing surfaces 26a and 27a. The transmission 3 uses the viscous resistance of the oil film (fluid friction) to transmit the rotational drive power of the input disc 26 to the output disc 27 through the power roller 34.

The trunnion 31 supports the power roller unit 30 while covering a part of the circumferential surface 34b. In the transmission 3, the trunnion 31 is pivotable (tiltable) about a tilt axis A3. The trunnion 31 tilts together with the power roller 34. The tilt axis A3 is skew to the transmission axis A1 and perpendicular to the rotational axis A2 (FIG. 1). As shown in FIGS. 3 and 4, the trunnion 31 includes: a base 31a which extends in the direction of the tilt axis A3 and on which the power roller unit 30 is mounted; and a pair of side walls 31b and 31c rising from the base 31a, the side walls 31b and 31c being opposed across the power roller unit 30 in the direction of the tilt axis A3 (the axial direction of tilt shafts) and facing the circumferential surface 34b of the power roller 34.

The base 31a includes a rotatably supporting portion 31d located in one surface of the base 31a to rotatably support the eccentric shaft 33a. The pair of side walls 31b and 31c project respectively from both longitudinal ends of the base 31a, and a space G1 accommodating the power roller 34 is defined between the pair of side walls 31b and 31c. The thickness direction of the pair of side walls 31b and 31c coincides with the direction of the tilt axis A3. The pair of side walls 31b and 31c include end surfaces 31e and 31f, respectively, the end surfaces 31e and 31f being located at distal ends of the side walls 31b and 31c in the direction in which the side walls 31b and 31c rise.

The end surfaces 31e and 31f include grooves 31g and 31h, respectively, the grooves 31g and 31h being located at the centers of the end surfaces 31e and 31f. The grooves 31g and 31h are formed by recessing the central regions of the end surfaces 31e and 31f. As shown in FIG. 3, the grooves 31g and 31h are open at both ends in the direction of the tilt axis A3. Each of the side walls 31b and 31c includes insertion holes 31i extending through the entire thickness of the side wall 31b or 31c in the direction of the tilt axis A3.

Tilt shafts (short shaft 31j and long shaft 31k) extending in the direction of the tilt axis A3 are located outside the pair of side walls 31b and 31c when viewed from the power roller unit 30. A non-illustrated actuator is coupled to either the short shaft 31j or long shaft 31k. In the transmission 3, each of the speed change units 29 is supported at its short and long shafts 31j and 31k so as to be tiltable about the tilt axis A3. Thus, the power roller 34 is rotatable about the tilt axis A3. The tilt angle of the speed change unit 29 (the angle of rotation relative to a reference position about the tilt axis A3) can be adjusted by moving the power roller 34 relative to the input and output discs 26 and 27 in the direction of the tilt axis A3 with the use of the actuator. The power roller 34 transmits the rotational drive power of the input disc 26 to the output disc 27 at a speed ratio determined by the tilt angle.

The beam 32 is located across the power roller 34 from the base 31a of the trunnion 31, and extends in the direction of the tilt axis A3 (the axial direction of the tilt shafts). The beam 32 is mounted on the pair of side walls 31b and 31c to reinforce the trunnion 31. The beam 32 is in an elongated shape extending in the direction of the tilt axis A3. The beam 32 includes: an elongated body portion 32g extending between the pair of side walls 31b and 31c; a pair of contact portions 32a located near to both longitudinal ends of the body portion 32g, respectively; and four extension portions 32c extending in the transverse direction (width direction) of the beam 32.

The pair of contact portions 32a are fitted into the grooves 31g and 31h, respectively, and thus the beam 32 is mounted on the pair of side walls 31b and 31c. Thus, the beam 32 is blocked from moving toward the base 31a of the trunnion 31 and blocked from moving in the transverse direction (i.e., a direction perpendicular to both the direction of the tilt axis A3 and the direction in which the side walls 31b and 31c rise).

As shown in FIG. 3, the extension portions 32c include insertion holes 32d that are aligned with the insertion holes 31i when the beam 32 is combined with the trunnion 31. The beam 32 is threadedly secured to the trunnion 31 at several points by fasteners P1 such as screws laterally inserted into the insertion holes 31i and 32d from outside the pair of side walls 31b and 31c. Thus, the beam 32 is coupled to the pair of side walls 31b and 31c. The structure for mounting the beam 32 on the trunnion 31 is not limited to that as described above, and any of various structures may be used to mount the beam 32 on the trunnion 31.

Two of the extension portions 32c are located close to one longitudinal end of the beam 32 and at a given distance from the inner surface of the side wall 31b, and the other two of the extension portions 32c are located close to the other longitudinal end of the beam 32 and at a given distance from the inner surface of the side wall 31c. The extension portions 32c extend toward the upper surface of the base 31a and the circumferential surface 34b of the power roller 34.

As shown in FIGS. 3 and 4, the speed change unit 29 includes oil passages F1 to F6 located inside the power roller unit 30, trunnion 31, and beam 32 to allow an oil for discharge toward the power roller 34 to flow inside the power roller unit 30, trunnion 31, and beam 32. The oil passages F1 to F3 are parts of a first oil passage E1 located inside the trunnion 31. The oil passages F4 to F6 are parts of a second oil passage E2 located inside the beam 32 and connected to the first oil passage E1.

Specifically, the trunnion 31 includes: the oil passage F1 originating from a first opening 311 located at the end surface of the short shaft 31j, passing inside the base 31a, and leading to the rotatably supporting portion 31d and a second opening 31m located at the upper surface of the base 31a; and the oil passage F2 branching from the oil passage F1, passing inside the side wall 31c, and leading to a third opening 31n located at the surface of the groove 31h in the end surface 31f of the side wall 31c.

The power roller unit 30 includes the oil passage F3 extending through the entire thickness of the support 33. The oil is fed to components such as the bearing 35 of the power roller unit 30 through the oil passage F3.

The beam 32 includes a fourth opening 32f located at the surface of the contact portion 32a which is in contact with the end surface 31f at which the third opening portion 31n is located. The beam 32 further includes: the oil passage F4 extending from the fourth opening 32f along the thickness of the beam 32 in a direction away from the trunnion 31 and bent at a given point to extend along the length of the beam 32; the oil passage F5 branching from the oil passage 4 toward one end of the width of the beam 32 at a point located toward one longitudinal end of the beam 32, the oil passage F5 extending inside one of the extension portions 32c in a direction in which the one extension portions 32c extends, the one extension portion 32c being that located toward the one longitudinal end; and the oil passage F6 branching from the oil passage 4 to the other end of the width of the beam 32 at a point located toward the other longitudinal end of the beam 32, the oil passage F6 extending inside another of the extension portions 32c in a direction in which the other extension portion 32c extends, the other extension portion 32c being that located toward the other longitudinal end.

Figure 5:
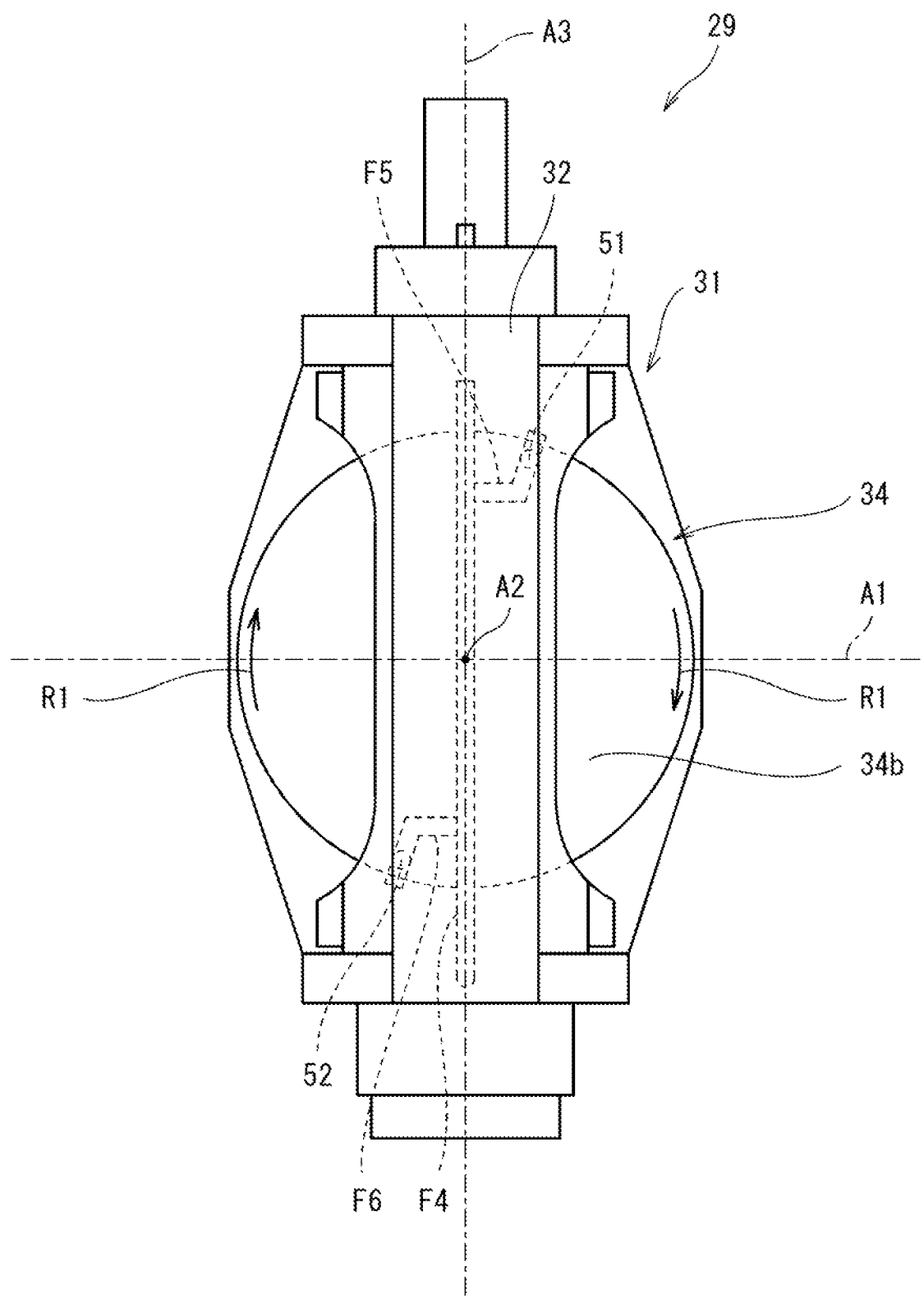
FIG. 5 is a schematic plan view of the speed change unit of FIG. 2 as viewed along the rotational axis of the power roller.

FIG. 5 is a schematic plan view of the speed change unit 29 as viewed along the rotational axis A2 of the power roller 34. As shown in FIG. 5, a first outlet (outlet) 51 is located in the vicinity of the downstream end of the oil passage F5. A second outlet (outlet) 52 is located in the vicinity of the downstream end of the oil passage F6. Both the first and second outlets 51 and 52 are directed toward the circumferential surface of the power roller 34. In the present embodiment, the beam 32 and power roller 34 are arranged such that the beam 32 and the circumferential surface of the power roller 34 face each other, and the beam 32 is disposed such that both the first and second outlets 51 and 52 are directed toward the circumferential surface of the power roller 34. The first and second outlets 51 and 52 are point-symmetric with respect to the rotational axis A2 of the power roller 34.

The first and second outlets 51 and 52 discharge the oil toward the power roller 34. For example, the first and second outlets 51 and 52 have a circular shape. The positional relationship of the input and output discs 26 and 27 with the beam 32, trunnion 31, and power roller 34 may be reversed.

The first outlet 51 will be described in more detail with reference to FIGS. 6A and 6B. FIG. 6A is a schematic perspective view showing the oil passage F5, the first outlet 51, and a jet of oil H1 discharged from the first outlet 51, and FIG. 6B is a schematic front view showing the oil passage F5, the first outlet 51, and the jet of oil H1. The direction in which an oil passage F5a extends is defined as a direction D1. The width direction of the oil passage F5a, which is perpendicular to the direction D1 in a plane perpendicular to the rotational axis A2 of the power roller 34 of FIG. 5, is defined as a direction D2. The direction in which the rotational axis A2 of the power roller 34 of FIG. 5 extends is defined as a direction D3.

As shown in FIGS. 6A and 6B, the oil passage F5 includes: the oil passage F5a branching from the oil passage F4 and extending downstream in the oil flow direction; a first oil passage F5b extending from a bend at the downstream end of the oil passage F5a toward the power roller 34; and a second oil passage F5c branching from the oil passage F5a at a point upstream of the first oil passage F5b and extending toward the power roller 34. The first and second oil passages F5b and F5c are inclined such that the first and second oil passages F5b and F5c become closer to each other as they extend downstream. The first and second oil passages F5b and F5c join together at the downstream end in the direction D3, and the first outlet 51 common to the first and second oil passages F5b and F5c is located at the common downstream end of the first and second oil passages F5b and F5c.

In FIG. 6A, a flow path cross-section f1 of the first oil passage F5b and a flow path cross-section f2 of the second oil passage F5c are shown. A flow path centerline L1 of the first oil passage F5b and a flow path centerline L2 of the second oil passage F5c are also shown in FIG. 6A.

In the present embodiment, the centerline L1 of the first oil passage F5b and the centerline L2 of the second oil passage F5c intersect inside the first outlet 51. The first outlet 51 opens at an end surface 32e of the beam 32. The first outlet 51 is located in a surface defining the end surface 32e of the beam 32. In the present embodiment, the centerlines L1 and L2 intersect inside the first outlet 51. That is, an intersection C1 between the centerlines L1 and L2 is located in a plane including the end surface 32e of the beam 32 at which the first outlet 51 is located. In the present embodiment, the first and second oil passages F5b and F5c are arranged such that an angle θ between the centerlines L1 and L2 is from 30° to 50° (e.g., 40°). The second outlet 52, which is point-symmetric to the first outlet 51 with respect to the rotational axis A2 of the power roller 34, is arranged in the same manner as the first outlet 51.

While the rotational shaft of the engine of the aircraft is driven and rotational drive power is transmitted from the engine to the electricity generator 4 through the transmission 3, the oil pump 7 is operated to allow the oil to flow through the oil passages F1 to F6 of the speed change unit 29 and be discharged from each of the first and second outlets 51 and 52 for the purpose of cooling the power roller 34.

The jet of oil H1 discharged from the first outlet 51 does not spread in the direction D1 in which the first and second oil passages F5b and F5c face each other, but spreads only in the direction D2 perpendicular to the direction in which the first and second oil passages F5b and F5c face each other while moving downstream in the direction D3. The reason is as follows: the oil flowing through the first oil passage F5b and the oil flowing through the second oil passage F5c collide with each other, and the kinetic momenta of the two oil flows in the direction D1 cancel each other, so that the jet of oil H1 does not spread in the direction D1 but in the direction D2 while moving downstream in the direction D3. Thus, the jet of oil H1 discharged from the first outlet 51 forms a flattened shape extending not in the direction D1 but only in the direction D2.

Figure 7:
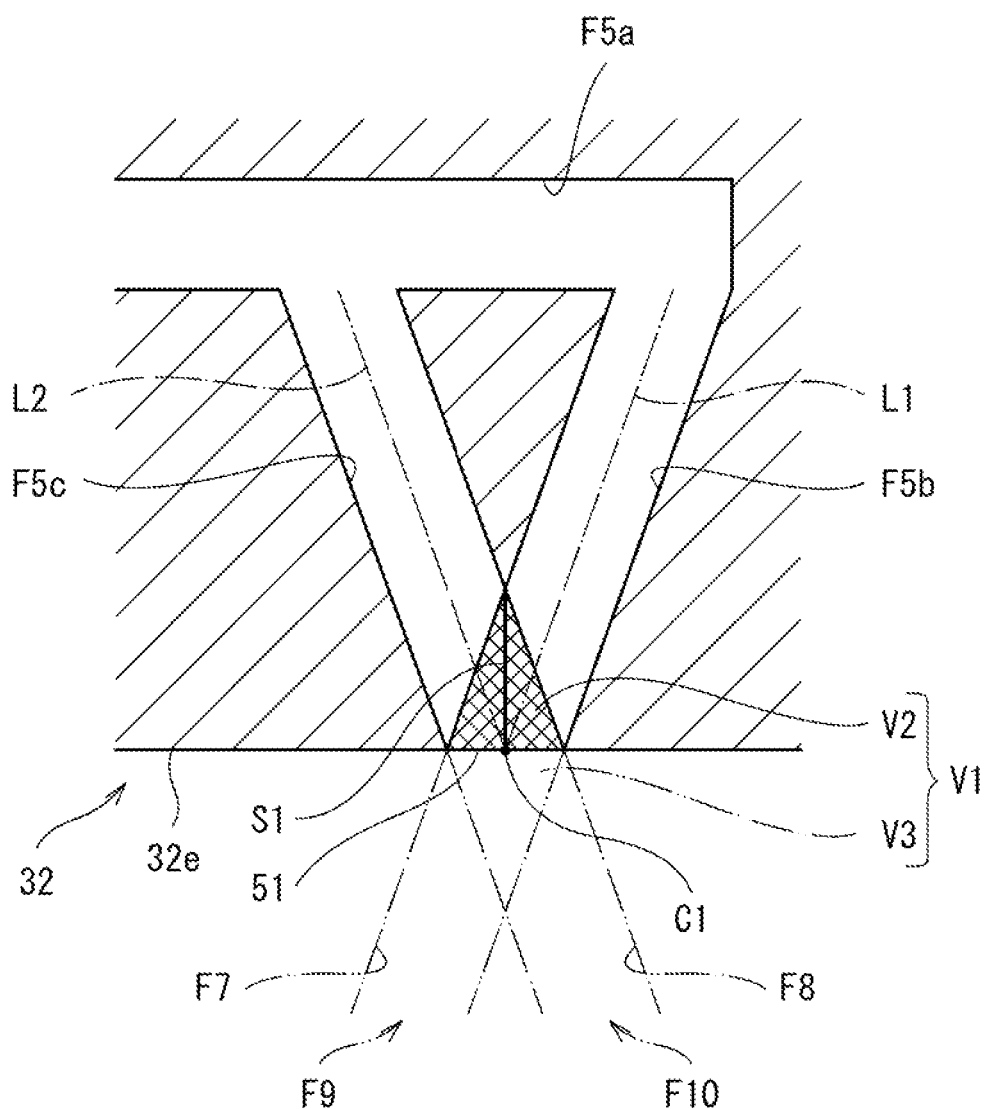
FIG. 7 is a cross-sectional view showing the positional relationship among the first oil passage, second oil passage, and first outlet of the speed change unit of FIG. 5.
Figure 8:
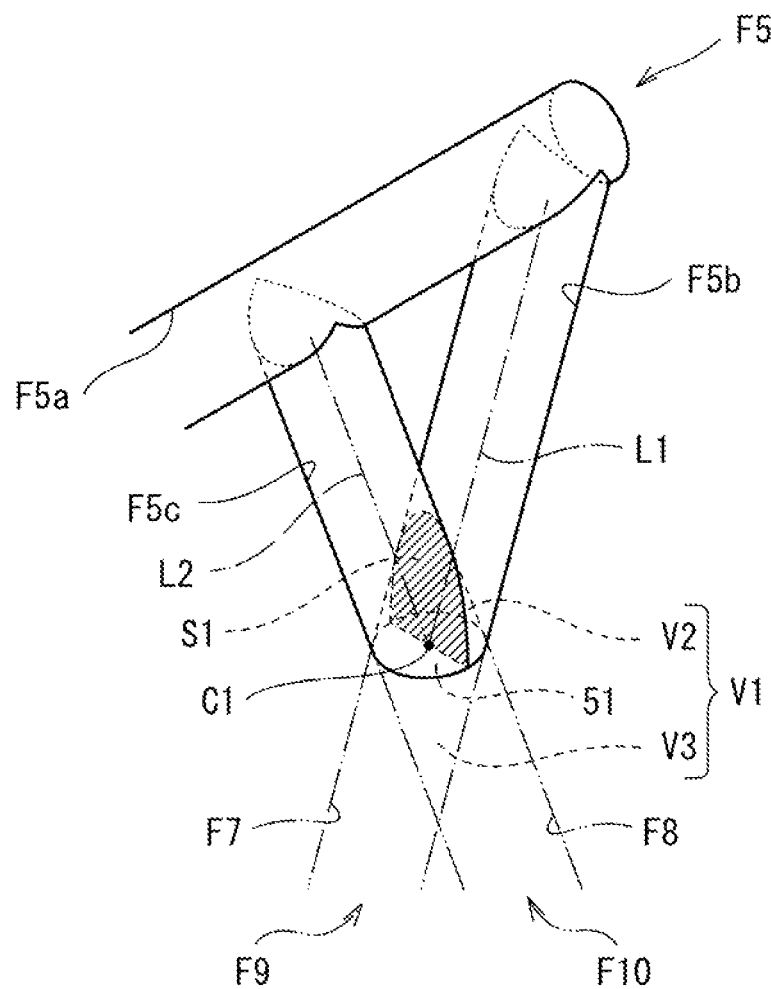
FIG. 8 is a perspective view schematically showing the first oil passage, second oil passage, and first outlet of the speed change unit of FIG. 5.

FIG. 7 is a cross-sectional view for describing the positional relationship among the oil passage F5a, first oil passage F5b, and second oil passage F5c in the beam 32, and FIG. 8 is a perspective view showing the oil passage F5a, first oil passage F5b, and second oil passage F5c.

As shown in FIGS. 7 and 8, an extension of the first oil passage F5b from the first outlet 51 is assumed as an imaginary oil passage F7, and an extension of the second oil passage F5c from the first outlet 51 is assumed as an imaginary oil passage F8. An oil passage F9 formed by the first oil passage F5b and imaginary oil passage F7 and an oil passage F10 formed by the second oil passage F5c and imaginary oil passage F8 intersect with each other, and an overlap region V1 between the oil passages F9 and F10 is situated across the first outlet 51. The portion of the overlap region V1 that is closer to the oil passage F5a than the first outlet 51 is defined as a beam-side overlap region V2. The portion of the overlap region V1 that is closer to the power roller 34 than the first outlet 51 is defined as a power roller-side overlap region V3.

The first outlet 51 is located between the beam-side overlap region V2 and the power roller-side overlap region V3. In the present embodiment, since the intersection C1 is located inside the end surface 32e, the overlap region V1 intersects with the end surface 32e. The first oil passage F5b in the shape of a cylindrical tube and the second oil passage F5c in the shape of a cylindrical tube intersect such that a surface S1 (connection region) is defined by the lines of intersection between the cylindrical tube-shaped first and second oil passages F5b and F5c in the region over which the first and second oil passages F5b and F5c intersect (are connected) with each other. In the present embodiment, the surface S1 is shaped as a part of a circle or an ellipse since each of the first and second oil passages F5b and F5c is in the shape of a cylindrical tube.

In the present embodiment, as shown in FIGS. 7 and 8, the intersection C1 is located in the same plane as the end surface 32e. Thus, the oil flowing through the first oil passage F5b and the oil flowing through the second oil passage F5c invariably collide with each other inside the first and second oil passages F5b and F5c, and the resulting oil flow is discharged from the first outlet 51.

In the present embodiment, since the centerlines L1 and L2 intersect inside the first outlet 51, the wall surfaces defining the first and second oil passages F5b and F5c can guide the oil flowing through the first oil passage F5b and the oil flowing through the second oil passage F5c until these oil flows collide with each other. Thus, the oil flowing through the first oil passage F5b and the oil flowing through the second oil passage F5c can invariably collide with each other.

Figure 9:
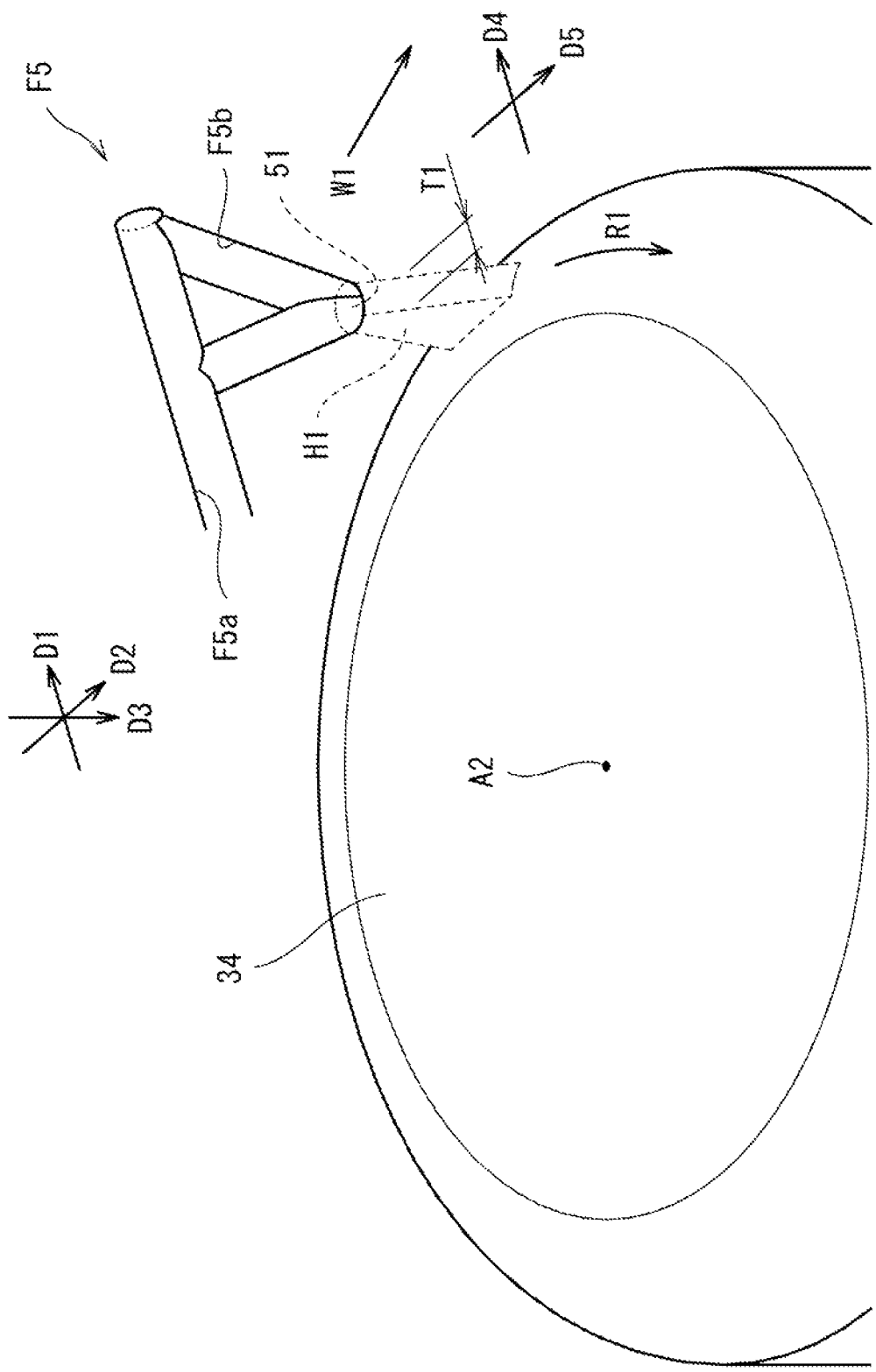
FIG. 9 is a schematic perspective view showing the oil passages, first outlet, and power roller of the speed change unit of FIG. 5 and the jet of oil discharged from the first outlet.

FIG. 9 is a schematic perspective view showing the oil passage F5, the first outlet 51, the jet of oil H1 discharged from the first outlet 51, and the power roller 34 as viewed when the oil is discharged toward the power roller 43 from the first outlet 51 of the beam 32 constructed as described above. The rotational direction of the power roller 34 is denoted by R1, and the direction of an ambient air flow entrained by the rotation of the power roller 34 is denoted by W1. Since the jet of oil H1 is discharged after collision between the oil flowing through the first oil passage F5b and the oil flowing through the second oil passage F5c, the jet of oil H1 forms a flattened shape having a thickness T1 in the direction D1. As such, the jet of oil H1 forms a flattened fan-like or triangular shape.

In the present embodiment, the oil passage F5 is disposed such that the direction D1 in which the oil passage F5a extends coincides with a radial direction D4 of the power roller 34. Thus, the first and second oil passages F5b and F5c face each other in the radial direction D4 of the power roller 34. As such, the jet of oil H1 discharged from the first outlet 51 does not spread in the radial direction D4 of the power roller 34, but spreads in a tangential direction D5 of the circumferential surface 34b which is perpendicular to the radial direction D4 of the power roller 34.

The jet of oil H1 discharged from the first outlet 51 spreads in the tangential direction D5 of the circumferential surface 34b of the power roller 34 and does not spread in the radial direction D4 of the power roller 34. Thus, the jet of oil H1 can be shaped to be resistant to the influence of a wind generated by rotation of the power roller 34. The jet of oil H1 is thin in the radial direction D4 of the power roller 34, and as such the portion of the jet of oil H1 that faces in the air flow direction W1 can have a small area. In other words, the jet of oil H1 is created such that in the event that rotation of the power roller 34 in the direction R1 generates a wind flowing in the direction W1, the portion of the jet of oil H1 that faces the wind flowing in the direction W1 has a small area. Thus, the jet of oil H1 can be shaped to be resistant to the influence of a wind flowing in the direction W1. In the event of a wind flowing in the direction W1, the jet of oil H1 can resist being blown off by the wind.

Since the jet of oil H1 can be shaped to resist being blown off by a wind generated by rotation of the power roller 34, the jet of oil H1 can be efficiently used to cool the power roller 34. Thus, reduction in the performance in cooling of the power roller 34 can be prevented, and high cooling performance can be achieved.

In the present embodiment described thus far, the first and second oil passages F5b and F5c are arranged to face each other in the radial direction D4 of the power roller 34 such that the jet of oil H1 forms a flattened shape that is long in the tangential direction D5 of the circumferential surface 34b of the power roller 34 and short in the radial direction of the power roller 34. However, the present invention is not limited to this configuration of the above embodiment. The direction in which the first and second oil passages F5b and F5c face each other need not be exactly the same as the radial direction D4 of the power roller 34. The first and second oil passages F5b and F5c may face each other in any direction so long as the jet of oil H1 discharged from the first outlet 51 is shaped to be resistant to the influence of a wind generated by rotation of the power roller 34 and flowing in the direction W1.

Thus, the jet of oil H1 only needs to be thin in the radial direction D4 of the power roller 34, and the direction in which the jet of oil H1 is extended need not coincide with the tangential direction D5 of the circumferential surface 34b of the power roller 34. The direction in which the jet of oil H1 is extended may be slightly inclined with respect to the tangential direction D5 of the circumferential surface 34b of the power roller 34. The direction in which the jet of oil H1 is extended may have a component which is in the tangential direction D5 of the circumferential surface 34b of the power roller 34 such that the portion of the jet of oil H1 that faces a wind flowing in the direction W1 has a small area. That is, the first and second oil passages F5b and F5c need not be arranged to face each other in a direction that is exactly the same as the radial direction D4 of the power roller 34. The direction in which the first and second oil passages F5b and F5c face each other may be inclined with respect to the radial direction D4 of the power roller 34 so long as the portion of the jet of oil H1 that faces a wind flowing in the direction W1 has a small area.

In the embodiment described above, the first outlet 51, first oil passage F5b, and second oil passage F5c are arranged such that the intersection C1 between the centerline L1 of the first oil passage F5b and the centerline L2 of the second oil passage F5c is located at the surface at which the first outlet 51 is located. However, the present invention is not limited to this configuration of the above embodiment.

The intersection C1 between the centerlines L1 and L2 need not be located at the surface at which the first outlet 51 is located.

Figure 10B:
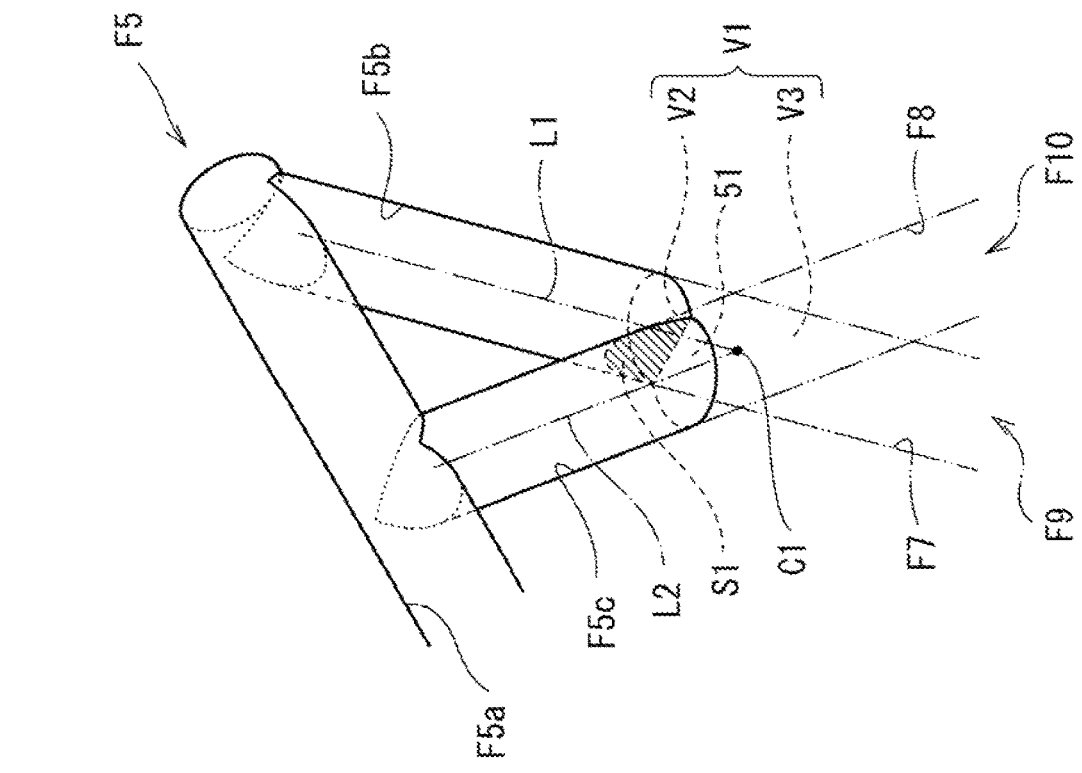
FIG. 10B is a perspective view schematically showing the first oil passage, second oil passage, and first outlet of FIG. 10A.
Figure 10A:
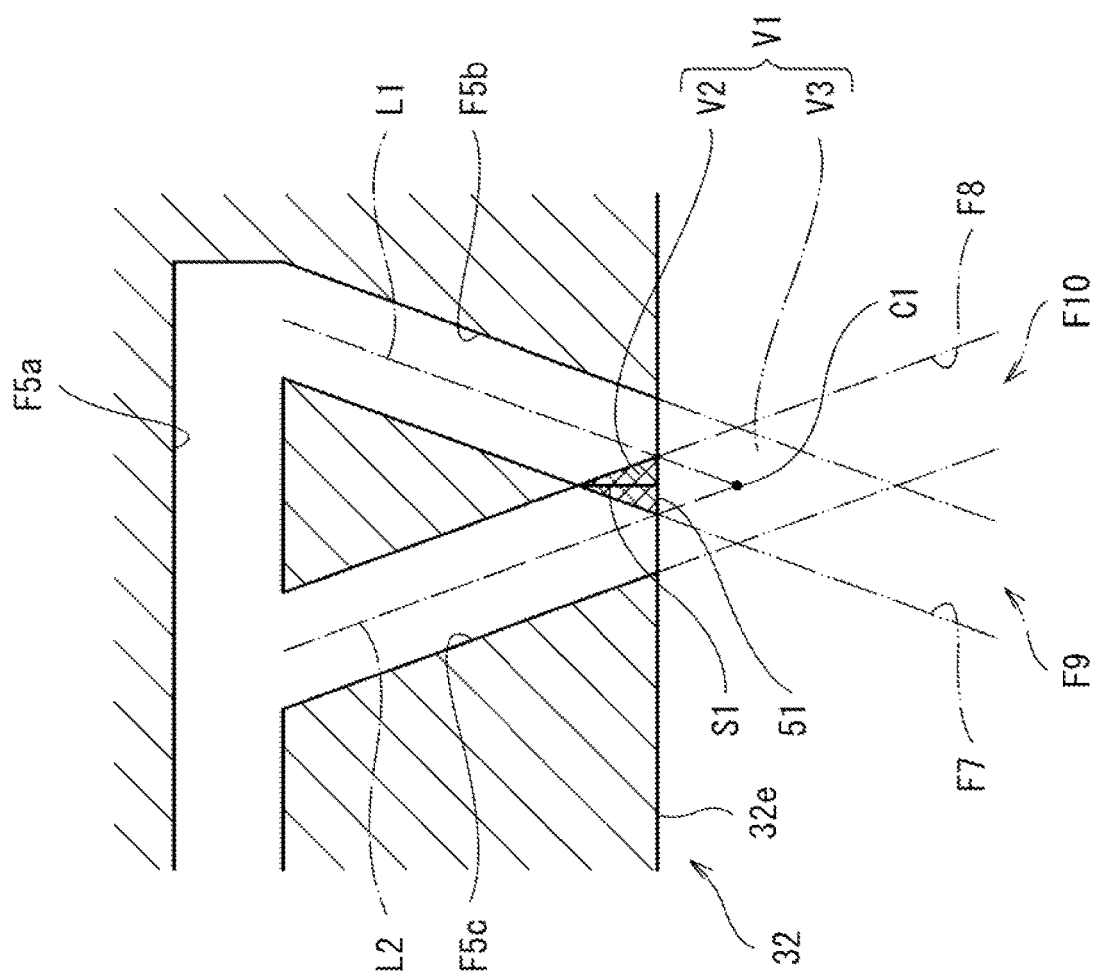
FIG. 10A is a cross-sectional view showing the first oil passage, second oil passage, and first outlet of a speed change unit in which the centerlines of the first and second oil passages intersect at a point downstream of the outlet in the oil discharge direction.

FIG. 10A is a cross-sectional view showing the oil passage F5a, first oil passage F5b, and second oil passage F5c of the beam 32 in an embodiment where the intersection C1 is located at a point closer to the power roller 34 than the surface at which the first outlet 51 is located (external point in the oil discharge direction), and FIG. 10B is a perspective view showing the oil passage F5a, first oil passage F5b, and second oil passage F5c.

The "external point in the oil discharge direction" refers to a point downstream of the first outlet 51 in the direction in which the oil is discharged. The "internal point in the oil discharge direction" as described below refers to a point located across the first outlet 51 from the external point and inside the first outlet 51 in the direction from the power roller 34 toward the first outlet 51.

Even in the case where, as shown in FIG. 10A, the intersection C1 is closer to the power roller 34 than that end surface 32e of the beam 32 at which the first outlet 51 is located, the oil flowing through the first oil passage F5b and the oil flowing through the second oil passage F5c can be made to collide with each other inside the first or second oil passage F5b or F5c so long as the first and second oil passages F5b and F5c are arranged such that the oil flows collide with each other in the vicinity of the first outlet 51. Specifically, in the configuration where the oil flowing through the first oil passage F5b and the oil flowing through the second oil passage F5c collide with each other at the internal point upstream of the first outlet 51 in the oil discharge direction, the oil flows can be made to collide with each other inside the first or second oil passage F5b or F5c. Thus, the jet of oil H1 discharged from the first outlet 51 can form a flattened shape as shown in FIG. 9.

The oil flowing through the first oil passage F5b and the oil flowing through the second oil passage F5c can be made to collide with each other in the vicinity of the first outlet 51 in the case where the intersection C1 is closer to the power roller 34 than the first outlet 51 but in the vicinity of the first outlet 51. Thus, the intersection C1 need not be located at the surface at which the first outlet 51 is located, and may be in the vicinity of the first outlet 51. That is, the intersection C1 need not be located at the surface at which the first outlet 51 is located so long as the centerline L1 of the first oil passage F5b and the centerline L2 of the second oil passage F5c intersect at a point in the vicinity of the first outlet 51 such that that the oil flowing through the first oil passage F5b and the oil flowing through the second oil passage F5c invariably collide with each other.

The "point in the vicinity of the first outlet 51" refers to the location of the intersection C1 located such that the overlap region V1 between the intersecting oil passages F9 and F10 intersects with the end surface 32e of the beam 32. In the configuration where the overlap region V1 between the intersecting oil passages F9 and F10 intersects with the end surface 32e, the oil flowing through the first oil passage F5b and the oil flowing through the second oil passage F5c collide with each other around the first outlet 51, and the oil flow resulting from the collision is immediately discharged from the first outlet 51. The wall surfaces defining the first and second oil passages F5b and F5c guide the oil flowing through the first oil passage F5b and the oil flowing through the second oil passage F5c, respectively, to ensure that the oil flows collide with each other. The oil flow resulting from the collision inside the first or second oil passage F5b or F5c is immediately discharged from the first outlet 51 toward the power roller 34. Thus, the jet of oil discharged from the first outlet 51 forms a flattened shape as shown in FIG. 9.

Figure 6:
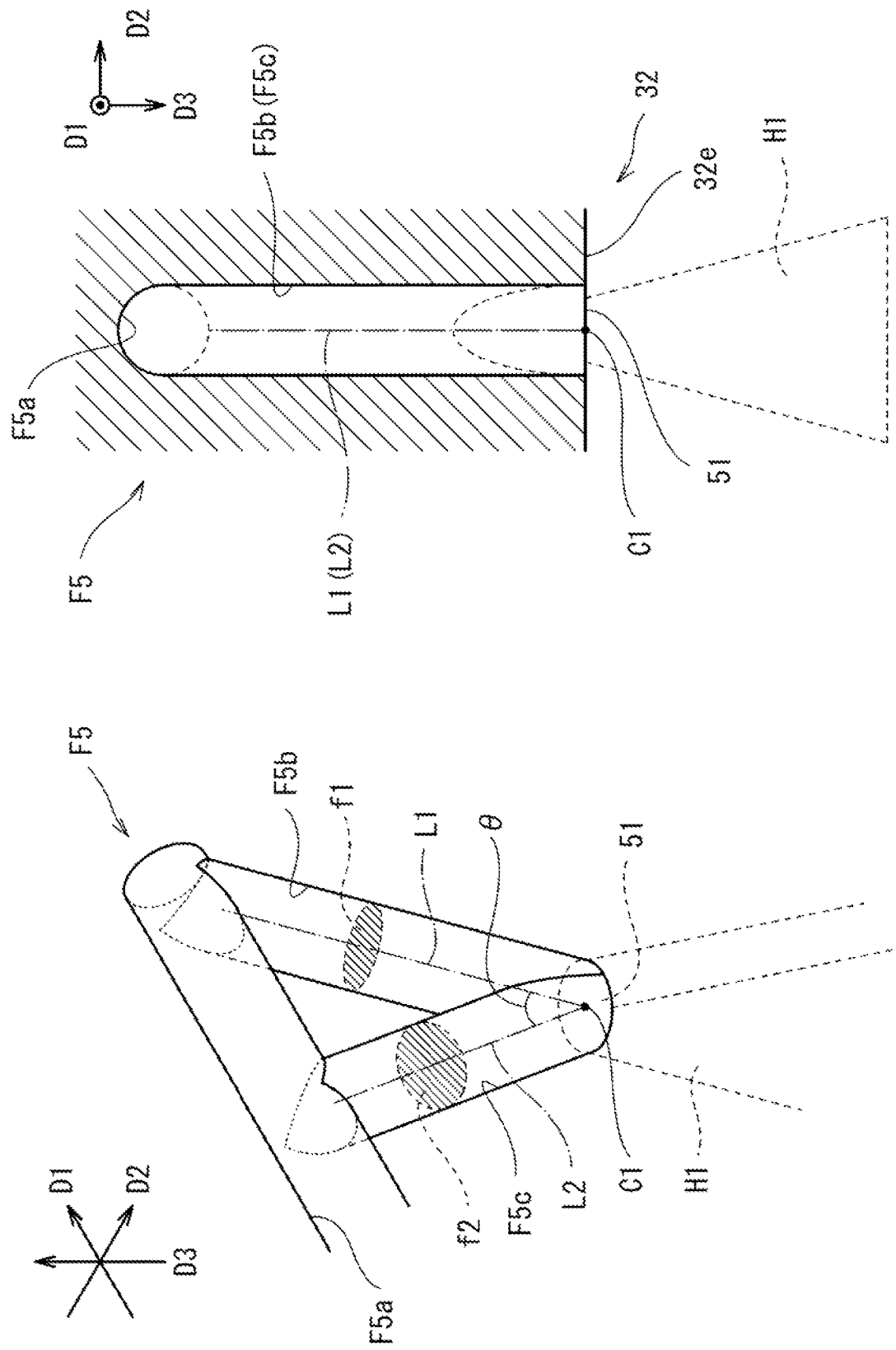
FIG. 6A is a schematic perspective view showing an oil passage and a first outlet of the speed change unit of FIG. 5 and a jet of oil discharged from the first outlet.
FIG. 6B is a schematic front cross-sectional view showing the oil passage, the first outlet, and the jet of oil discharged from the first outlet.

The first and second oil passages F5b and F5c are arranged such that the surface S1 intersects with that end surface 32e of the beam 32 at which the first outlet 51 is located. Since the centerlines L1 and L2 of the first and second oil passages F5b and F5c intersect at a point in the vicinity of the first outlet 51, the surface S1 intersects with the end surface 32e. Although the centerlines L1 and L2 of the first and second oil passages F5b and F5c do not intersect at the end surface 32e in which the first outlet 51 is located, the surface S1 intersects with the end surface 32e since the centerlines L1 and L2 intersect at a point in the vicinity of the first outlet 51. In this case, where the intersection C1 is located in the vicinity of the first outlet 51 such that the surface S1 intersects with the end surface 32e, the oil flowing through the first oil passage F5b and the oil flowing through the second oil passage F5c can be made to collide with each other in the vicinity of the first outlet 51. Thus, the jet of oil H1 discharged from the first outlet 51 can form a flattened shape as shown in FIG. 6 or 7.

Figure 11A:
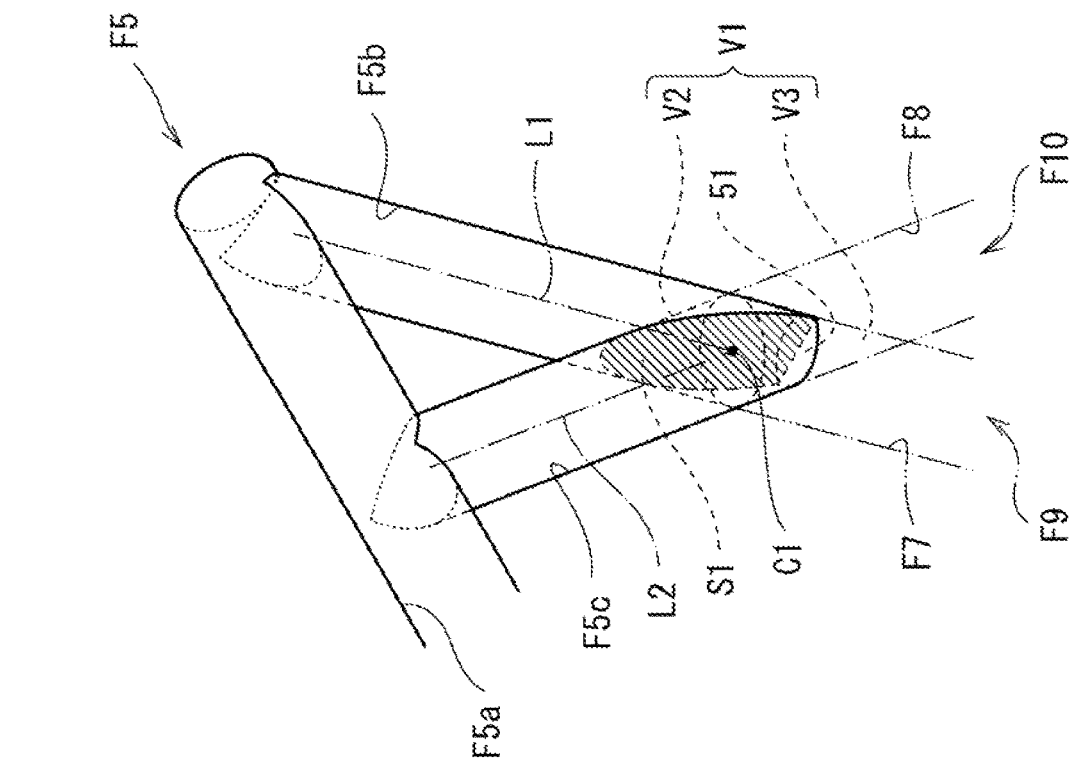
FIG. 11A is a cross-sectional view showing the first oil passage, second oil passage, and first outlet of a speed change unit in which the centerlines of the first and second oil passages intersect at a point upstream of the outlet in the oil discharge direction.

The following describes an embodiment where the intersection C1 is located at a point closer to the oil passage F5a than that end surface 32e of the beam 32 at which the first outlet 51 is located (internal point in the oil discharge direction). FIG. 11A is a cross-sectional view showing the oil passage F5a, first oil passage F5b, and second oil passage F5c of the beam 32 in an embodiment where the intersection C1 is located at an internal point upstream of the end surface 32e in the oil discharge direction, and FIG. 11B is a perspective view showing the oil passage F5a, first oil passage F5b, and second oil passage F5c.

Even in the case where, as shown in FIG. 11A, the intersection C1 is closer to the oil passage F5a than that end surface 32e of the beam 32 at which the first outlet 51 is located, the oil flowing through the first oil passage F5b and the oil flowing through the second oil passage F5c can be made to collide with each other inside the first or second oil passage F5b or F5c so long as the first and second oil passages F5b and F5c are arranged such that the oil flows collide with each other in the vicinity of the first outlet 51. Thus, the jet of oil H1 discharged from the first outlet 51 can form a flattened shape as shown in FIG. 9.

Even in the embodiment where the intersection C1 is located upstream and in the vicinity of the first outlet 51 in the oil discharge direction, the oil flowing through the first oil passage F5b and the oil flowing through the second oil passage F5c can be made to collide with each other in the vicinity of the first outlet 51. Thus, the intersection C1 need not be located at the surface at which the first outlet 51 is located, and may be in the vicinity of the first outlet 51.

Figure 11B:
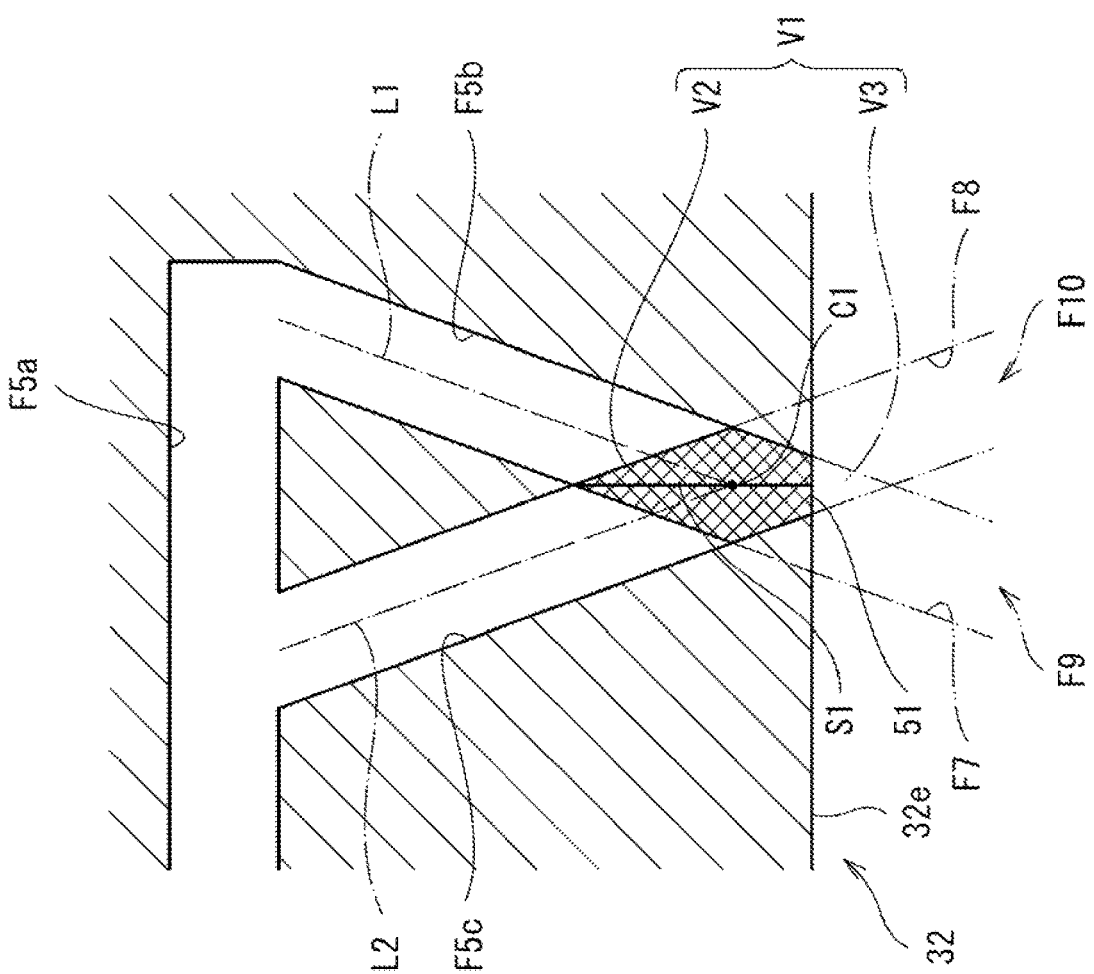
FIG. 11B is a perspective view schematically showing the first oil passage, second oil passage, and first outlet of FIG. 11A.

Since the intersection C1 is located in the vicinity of the first outlet 51, the overlap region V1 between the intersecting oil passages F9 and F10 intersects with the end surface 32e as shown in FIGS. 11A and 11B. Thus, the oil flowing through the first oil passage F5b and the oil flowing through the second oil passage F5c collide with each other around the first outlet 51, and the oil flow resulting from the collision is discharged from the first outlet 51. The wall surfaces defining the first and second oil passages F5b and F5c guide the oil flowing through the first oil passage F5b and the oil flowing through the second oil passage F5c, respectively, to ensure that the oil flows invariably collide with each other. The oil flow resulting from the collision inside the first or second oil passage F5b or F5c is immediately discharged from the first outlet 51 toward the power roller 34. Thus, the jet of oil discharged from the first outlet 51 forms a flattened shape as shown in FIG. 9.

The first and second oil passages F5b and F5c are arranged such that the surface S1 intersects with the end surface 32e. In this case, where the intersection C1 is located in the vicinity of the first outlet 51 such that the surface S1 intersects with the end surface 32e, the oil flowing through the first oil passage F5b and the oil flowing through the second oil passage can be made to collide with each other in the vicinity of the first outlet 51. Thus, the jet of oil H1 discharged from the first outlet 51 can form a flattened shape as shown in FIG. 9.

In the embodiments described above, each of the first and second oil passages F5b and F5c is in the shape of a cylindrical tube, and the surface S1 defined as the connection region is circular or elliptical. However, the present invention is not limited to such a configuration of the above embodiments, and the first and second oil passages F5b and F5c may have a shape other than the shape of a cylindrical tube. For example, the first and second oil passages F5b and F5c may be in the shape of a tube having a square or rectangular cross-section.

Although in the embodiments described above the centerlines L1 and L2 are arranged such that the angle θ (FIG. 6A) between the centerlines L1 and L2 is 40°, the present invention is not limited to such a configuration of the above embodiments. The angle θ between the centerlines L1 and L2 may be smaller or larger than 40°. The angle θ between the centerlines L1 and L2 is preferably 80° or less. If the angle θ between the centerlines L1 and L2 is excessively large, the thickness T1 (FIG. 9) of the jet of oil H1 discharged from the first outlet 51 is excessively small.

Figure 12:
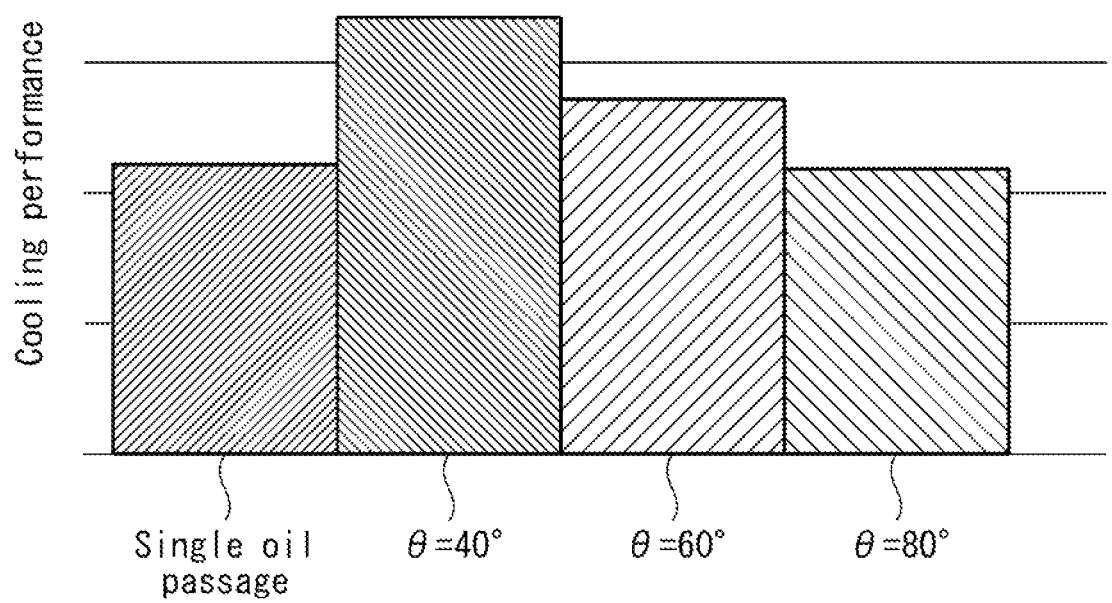
FIG. 12 is a graph showing the change in the performance in cooling of the power roller with resect to the angle between the first and second oil passages in the speed change unit of FIG. 5.

FIG. 12 is a graph showing the change in cooling performance with respect to the angle between the first and second oil passages F5b and F5c. As shown in FIG. 12, in the case where the angle θ between the centerlines L1 and L2 is larger than 40°, the performance in cooling of the power roller 34 decreases with increasing angle θ. In the case where the angle θ between the centerlines L1 and L2 is larger than 40°, the thickness T1 of the jet of oil H1 gradually decreases with increasing angle θ. If the thickness T1 of the jet of oil H1 is excessively small, most of the jet of oil H1 discharged from the first outlet 51 is blown off by a wind flowing in the direction W1 before reaching the power roller 34. Thus, the oil discharged from the first outlet 51 cannot be used fully to cool the power roller 34, and the performance in cooling of the power roller 34 is reduced.

If the angle θ between the centerlines L1 and L2 is larger than 80°, the thickness T1 of the jet of oil is excessively small, and for this reason the performance in cooling of the power roller 34 is lower than in the case where a jet of oil is discharged through a single oil passage rather than through both the first and second oil passages F5b and F5c branching from the oil passage F5a. Thus, the angle θ between the centerlines L1 and L2 is preferably 80° or less.

In the embodiments described above, the first outlet 51 located toward one longitudinal end of the beam 32 and the second outlet 52 located toward the other longitudinal end of the beam 32 are identical, and the first and second oil passages F5b and F5c connected to the first outlet 51 and the first and second oil passages connected to the second outlet 52 are identical. Thus, the jet of oil discharged from the second outlet 52 forms the same shape as the jet of oil H1 discharged from the first outlet 51.

In the embodiments described above, each speed change unit 29 includes two outlets, and both of the two outlets discharge the oil such that the jet of oil discharged from each outlet is shaped to be resistant to the influence of a wind generated by rotation of the power roller 34. The present invention is not limited to such a configuration of the above embodiments. In the case where each speed change unit includes two or more outlets, it is not essential that all of the outlets discharge the oil such that the jets of oil discharged from the outlets are shaped to be resistant to the influence of a wind generated by rotation of the power roller 34. For example, in the case where each speed change unit includes two outlets as in the embodiments described above, only one of the two outlets may discharge the oil such that the jet of oil discharged from the one outlet is shaped to be resistant to the influence of a wind generated by rotation of the power roller 34. Thus, in the case where each speed change unit includes two or more outlets, it is only required that at least one of the outlets should discharge the oil such that the jet of oil discharged from the at least one outlet is shaped to be resistant to the influence of a wind generated by rotation of the power roller 34.

In the embodiments described above, the first and second outlets 51 and 52 are included in the beam 32, and the beam 32 functions as the discharge structure including outlets. The present invention is not limited to such a configuration of the above embodiments, and outlets may be included in an element other than the beam 32. For example, the trunnion 31 may further include a portion located across the power roller 34 from the base 31a and extending in the direction of the tilt axis A3, and outlets may be included in this portion of the trunnion 31. In this case, the trunnion 31 functions as the discharge structure including outlets. Another element may function as the discharge structure. That is, the discharge structure may be any element other than the beam 32 and trunnion 31 so long as the discharge structure includes outlets that discharge the oil toward the power roller 34.

In the embodiments described above, the first and second oil passages F5b and F5c are arranged such that the oil flowing through the first oil passage F5b and the oil flowing through the second oil passage F5c collide with each other in the vicinity of the first outlet 51 and that the jet of oil discharged from the first outlet 51 forms a flattened shape extending along the rotational direction of the power roller 34. As such, the portion of the jet of oil H1 that faces in the rotational direction of the power roller 34 has a small area. Thus, the jet of oil H1 can be shaped to resist being blown off by a wind generated by rotation of the power roller 34. Therefore, a sufficient amount of oil can be fed to the power roller 34 to efficiently cool the power roller 34.

The first and second oil passages F5b and F5c are arranged such that the surface S1 intersects with the end surface 32e, and this ensures that the first and second oil passages F5b and F5c are connected with each other in the vicinity of the end surface 32e. Thus, the wall surfaces defining the first and second oil passages F5b and F5c guide the oil flowing through the first oil passage F5b and the oil flowing through the second oil passage F5c, respectively, to ensure that the oil flows collide with each other in the vicinity of the first outlet 51. As such, the oil flowing through the first oil passage F5b and the oil flowing through the second oil passage F5c invariably collide with each other, and the oil flow resulting from the collision is discharged from the first outlet 51, so that the jet of oil H1 invariably forms a flattened shape. Since the first and second oil passages F5b and F5c are arranged such that the jet of oil H1 is extended along the rotational direction of the power roller 34, the portion of the jet of oil H1 that faces in the rotational direction of the power roller 34 has a small area. Thus, the jet of oil H1 can be shaped to resist being blown off by a wind generated by rotation of the power roller 34. As such, a sufficient amount of oil can be fed to the power roller 34 to efficiently cool the power roller 34.

The power roller 34 can be efficiently cooled by the jet of oil H1. Thus, the oil amount in the jet of oil H1 discharged to cool the power roller 34 can be reduced. Since the amount of the oil to be fed can be reduced, the oil pump 7, oil cooler, oil tank, oil piping line, and other related devices used in the aircraft electricity generation apparatus 1 can be downsized. This allows for reduced weight and improved fuel economy of the aircraft. Additionally, churning of the oil by the oil pump 7 can be reduced to decrease the churning loss in the oil pump 7. Thus, the fuel economy of the aircraft can be further improved.

An increase in the amount of the oil to be fed could lead to size increase of the devices such as the oil pump 7, oil cooler, oil tank, and oil piping line used in the aircraft electricity generation apparatus 1 and therefore weight increase of the aircraft electricity generation apparatus 1, resulting in reduced fuel economy of the aircraft. It is also conceivable that the size or rotational speed of the oil pump 7 should be increased due to an increase in the amount of the oil to be discharged. In this case, the churning loss in the oil pump 7 is increased, and accordingly the heat generation from the oil under churning is increased. The increased heat generation could lead to a corresponding reduction in the efficiency of the aircraft electricity generation apparatus 1. This could result in reduced fuel economy of the aircraft.

The electricity generation apparatus 1 according to an exemplary embodiment is constructed using the transmission 3 that can cool the power roller 34 efficiently. Thus, the electricity generation apparatus 1 can be provided as an electricity generation apparatus in which the temperature increase of the power roller 34 can be minimized.

The invention claimed is:

1. A toroidal continuously variable transmission comprising:
    input and output discs opposed to each other;
    a power roller tiltably held between the input and output discs to transmit rotational drive power of the input disc to the output disc at a speed ratio determined by a tilt angle of the power roller; and
    a discharge structure including an outlet that discharges an oil, wherein
    the discharge structure includes first and second oil passages connected with each other inside the discharge structure, and
    the first and second oil passages are arranged such that the oil flowing through the first oil passage and the oil flowing through the second oil passage collide with each other in the vicinity of the outlet and that a jet of oil discharged from the outlet forms a flattened shape extending along a rotational direction of the power roller.

2. The toroidal continuously variable transmission according to claim 1, wherein centerlines of the first and second oil passages intersect at a point located in the same plane as an end surface of the discharge structure, the end surface being a surface at which the outlet is located.

3. The toroidal continuously variable transmission according to claim 1, wherein
    centerlines of the first and second oil passages intersect at an external point downstream of an end surface of the discharge structure in a direction in which the oil is discharged from the outlet, the end surface being a surface at which the outlet is located, and
    at least a part of the oil flowing through the first oil passage and at least a part of the oil flowing through the second oil passage collide with each other at an internal point upstream of the outlet in the direction in which the oil is discharged.

4. The toroidal continuously variable transmission according to claim 1, wherein centerlines of the first and second oil passages intersect at an internal point upstream of an end surface of the discharge structure in a direction in which the oil is discharged from the outlet, the end surface being a surface at which the outlet is located.

5. The toroidal continuously variable transmission according to claim 1, wherein an angle between the first and second oil passages is 80° or less.

6. A toroidal continuously variable transmission comprising:
    input and output discs opposed to each other;
    a power roller tiltably held between the input and output discs to transmit rotational drive power of the input disc to the output disc at a speed ratio determined by a tilt angle of the power roller; and
    a discharge structure including an outlet that discharges an oil, wherein
    the discharge structure includes first and second oil passages connected with each other inside the discharge structure,
    the first and second oil passages are located inside the discharge structure such that a connection region where the first and second oil passages are connected intersects with an end surface of the discharge structure, the end surface being a surface at which the outlet is located, and
    the discharge structure is disposed such that a jet of oil discharged from the outlet is extended along a rotational direction of the power roller.

7. A drive mechanism-integrated electricity generation apparatus for an aircraft, comprising:
    the toroidal continuously variable transmission according to claim 1;
    an input mechanism that inputs rotational drive power from a rotational shaft of an engine of the aircraft to the toroidal continuously variable transmission; and
    an electricity generator driven by output of the toroidal continuously variable transmission.

\* \* \* \* \*